(12) United States Patent
Monroe et al.

(10) Patent No.: US 8,234,202 B2
(45) Date of Patent: *Jul. 31, 2012

(54) SYSTEM AND METHOD FOR IMPROVED ORDER ENTRY USING MARKET DEPTH

(75) Inventors: Fred Monroe, Silver Spring, MD (US); Michael J. Burns, Riverside, IL (US); Scott F. Singer, Lake Bluff, IL (US)

(73) Assignee: Trading Technologies International Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/189,513

(22) Filed: Jul. 24, 2011

(65) Prior Publication Data

US 2011/0282775 A1 Nov. 17, 2011

Related U.S. Application Data

(63) Continuation of application No. 12/912,719, filed on Oct. 26, 2010, now Pat. No. 8,010,437, which is a continuation of application No. 12/479,231, filed on Jun. 5, 2009, now Pat. No. 7,844,531, which is a continuation of application No. 10/955,289, filed on Sep. 30, 2004, now Pat. No. 7,574,391.

(51) Int. Cl.
*G06Q 40/00* (2012.01)
(52) U.S. Cl. .................................... 705/36 R
(58) Field of Classification Search .................. None
See application file for complete search history.

(56) References Cited

U.S. PATENT DOCUMENTS

| 5,963,923 | A  | 10/1999 | Garber |
| 6,983,260 | B2 | 1/2006  | Hummelgren |
| 7,039,610 | B2 | 5/2006  | Morano et al. |
| 7,155,410 | B1 | 12/2006 | Woodmansey et al. |
| 7,177,833 | B1 | 2/2007  | Marynowski et al. |
| 7,225,153 | B2 | 5/2007  | Lange |
| 7,243,083 | B2 | 7/2007  | Burns et al. |
| 7,246,092 | B1 | 7/2007  | Peterson et al. |

(Continued)

FOREIGN PATENT DOCUMENTS

JP 2002197281 A 7/2002

(Continued)

OTHER PUBLICATIONS

Balbas et. al.; Vector Optimization Approach for Pricing and Hedging in Imperfect Markets; INFOR; vol. 42, No. 3; pp. 217-233; Aug. 2004.*

(Continued)

*Primary Examiner* — Alexander Kalinowski
*Assistant Examiner* — Virpi Kanervo
(74) *Attorney, Agent, or Firm* — McDonnell Boehnen Hulbert & Berghoff LLP

(57) ABSTRACT

Market depth information pertaining to the hedging side is utilized to intelligently break a non-hedging order into multiple orders, such that the orders rest at cascading price levels. This way, the trader can benefit from sweeps in the book and still properly account for the market depth on the hedging side. Further, there is a greater probability of receiving "partials" on the spread order. In addition, hedge orders may be sent at multiple price levels, or sent to the market in pieces over time. By applying a more intelligent process to hedge orders (as opposed to "fire and forget") an alternative beyond limit orders that can be leged or market orders is provided.

24 Claims, 6 Drawing Sheets

U.S. PATENT DOCUMENTS

| | | | |
|---|---|---|---|
| 7,251,629 B1 | 7/2007 | Marynowski et al. | |
| 7,299,208 B1 | 11/2007 | Bailon et al. | |
| 7,418,416 B2 * | 8/2008 | Guidi et al. | 705/36 R |
| 7,437,325 B2 | 10/2008 | Kemp, II et al. | |
| 7,574,391 B1 | 8/2009 | Monroe et al. | |
| 7,742,972 B2 | 6/2010 | Lange et al. | |
| 7,844,531 B1 | 11/2010 | Monroe et al. | |
| 2002/0023056 A1 | 2/2002 | Udo et al. | |
| 2002/0194105 A1 | 12/2002 | Klein | |
| 2003/0004852 A1 | 1/2003 | Burns | |
| 2003/0200167 A1 | 10/2003 | Kemp, II et al. | |
| 2004/0093300 A1 | 5/2004 | Burns | |
| 2004/0199453 A1 | 10/2004 | Brady et al. | |
| 2004/0236636 A1 | 11/2004 | Lutnick et al. | |
| 2005/0075963 A1 | 4/2005 | Balabon | |
| 2005/0125327 A1 | 6/2005 | Fishbain | |
| 2005/0154668 A1 | 7/2005 | Burns et al. | |
| 2005/0222936 A1 | 10/2005 | Panariti et al. | |
| 2006/0200405 A1 | 9/2006 | Burns et al. | |
| 2006/0235787 A1 | 10/2006 | Burns et al. | |
| 2007/0100736 A1 | 5/2007 | Singer et al. | |

FOREIGN PATENT DOCUMENTS

| | | | |
|---|---|---|---|
| WO | WO2005010790 A1 | 3/2005 | |

OTHER PUBLICATIONS

Balbas et. al.; Vector Optimization Approach for Pricing and Hedging in Imperfect Markets; INFOR; vol. 42, No. 3; p. 217; Aug. 2004.*

Longo, Mark; Equity Pros Join the Club: the Days of Trading Exclusively in One Asset Class are History; Traders Magazine; New York; p. 1; Jun. 1, 2004.*

Rowan, Samantha; New CMBS Risk Management Platform Set to Debut; Real Estate Finance and Investment; New York; p. 1; May 17, 2004.*

Nematnejad, Aaron; the TED spread trade; illustration of the analytics using Bloomberg, Jan. 2003; YieldCurve.com.

Exchanges and Regulators; NYMEX demos access, says system will debut in nine months' time; Oct. 21, 1991; Trading Systems Technology; v 5, n 8.

Futures (Cedar Falls, Iowa); Mar. 2001; OptionVue 5; v. 1.40.

Thapar, Neil, Spread Betting is Booming, Jun. 6 2004, Sunday Business, London, p. 1.

Allen, Steve and Padovani, Otello, Risk Management using Quasi-static Hedging, 2002, Economic Notes, vol. 31, pp. 277-336.

Ahn, Hee-Joon et al. The Components of a Bid-Ask Spread in a Limit-Order Market, 2002, Journal of Empirical Finance, vol. 9, pp. 399-430.

U.S. Appl. No. 11/415,887, filed May 2, 2006.

Alejandro Balbas and Silvia Mayoral; Vector Optimization Approach for Pricing and Hedging in Imperfect Markets; INFOR; vol. 42, No. 3, p. 217; Aug. 2004.

Angus McCrone; Day-to-Day Traders Turn Up the Volume in Financial Spreads; Evening Standard, London (UK); Apr. 24, 2002; p. 39; B Edition.

* cited by examiner

Product 1
(Non-Hedging Side)

| Bid Qty | Price | Ask Qty |
|---|---|---|
|  | 304 |  |
|  | 303 |  |
|  | 302 |  |
|  | 301 | 160 |
|  | 300 | 245 |
|  | 299 | 115 |
|  | 298 | 175 |
|  | 297 | 210 |
|  | 296 |  |
| 165 | 295 |  |
| 250 | 294 |  |
| 274 | 293 |  |
| 150 | 292 |  |
|  | 291 |  |

Product 2
(Hedging Side)

| Bid Qty | Price | Ask Qty |
|---|---|---|
|  | 249 |  |
|  | 248 |  |
|  | 247 | 145 |
|  | 246 |  |
|  | 245 | 250 |
|  | 244 | 225 |
|  | 243 | 350 |
|  | 242 | 150 |
|  | 241 |  |
| 230 | 240 |  |
| 170 | 239 |  |
| 200 | 238 |  |
|  | 237 |  |
| 150 | 236 |  |

Second approach sends an order at this price → 299

First approach sends an order at this price → 298

Second approach uses this information (245/250, 244/225, 243/350)

First approach uses this information (242/150)

FIG. 1

Product 1
(Non-Hedging Side)

| Bid Qty | Price | Ask Qty | Wrk Ord |
|---|---|---|---|
| | 304 | | |
| | 303 | | |
| | 302 | | |
| | 301 | 160 | |
| | 300 | 270 | 25 |
| | 299 | 340 | 225 |
| | 298 | 525 | 350 |
| | 297 | 360 | 150 |
| | 296 | | |
| 165 | 295 | | |
| 250 | 294 | | |
| 274 | 293 | | |
| 150 | 292 | | |
| | 291 | | |

Product 2
(Hedging Side)

| Bid Qty | Price | Ask Qty |
|---|---|---|
| | 249 | |
| | 248 | |
| | 247 | 145 |
| | 246 | |
| | 245 | 250 |
| | 244 | 225 |
| | 243 | 350 |
| | 242 | 150 |
| | 241 | |
| 230 | 240 | |
| 170 | 239 | |
| 200 | 238 | |
| | 237 | |
| 150 | 236 | |

FIG. 5

Product 1
(Non-Hedging Side)

| Bid Qty | Price | Ask Qty | Wrk Ord |
|---|---|---|---|
|  | 304 |  |  |
|  | 303 |  |  |
|  | 302 |  |  |
|  | 301 | 160 |  |
|  | 300 | 245 |  |
|  | 299 |  |  |
|  | 298 |  |  |
|  | 297 |  |  |
|  | 296 |  |  |
| 165 | 295 |  |  |
| 250 | 294 |  |  |
| 274 | 293 |  |  |
| 150 | 292 |  |  |
|  | 291 |  |  |

Market swept the book

Product 2
(Hedging Side)

| Bid Qty | Price | Ask Qty |
|---|---|---|
|  | 249 |  |
|  | 248 |  |
|  | 247 | 145 |
|  | 246 |  |
|  | 245 | 225 |
|  | 244 |  |
|  | 243 |  |
|  | 242 |  |
|  | 241 |  |
| 230 | 240 |  |
| 170 | 239 |  |
| 200 | 238 |  |
|  | 237 |  |
| 150 | 236 |  |

Hedge order takes a total of "750"

SYSTEM AND METHOD FOR IMPROVED ORDER ENTRY USING MARKET DEPTH

CROSS-REFERENCE TO RELATED APPLICATIONS

This application is a continuation of U.S. patent application Ser. No. 12/912,719 filed Oct. 26, 2010, now U.S. Pat. No. 8,010,437, entitled "System and Method for Improved Order Entry Using Market Depth," which is a continuation of U.S. patent application Ser. No. 12/479,231 filed Jun. 5, 2009, now U.S. Pat. No. 7,844,531, which is a continuation of U.S. patent application Ser. No. 10/955,289 filed Sep. 30, 2004, now U.S. Pat. No. 7,574,391, the contents of all of which are fully incorporated herein by reference.

TECHNICAL FIELD

The present invention relates generally to data processing systems for use in electronic trading and, more particularly, the present invention is directed to tools for use in electronic trading.

BACKGROUND

An automated trading tool gives a user the ability to set up a program that can respond automatically to patterns in market activity, and in response, submit orders directly to an electronic exchange. The use of such trading tools is on the rise and for good reason. Sophisticated trading tools can intelligently sense market conditions and automatically respond—often much faster than a human. Until recently, such sophisticated trading tools were only available to a limited number of people. Now, in a marketplace where automated programs commonly trade against automated programs, in those circumstances, a manual-style trader may find it difficult to survive without some kind of automated assistance.

Automated trading tools are frequently used to hedge, which is a trading strategy made to reduce the risk of adverse price movements in a tradable object, by taking an offsetting position in the same or a related tradable object. For instance, a trader might execute a trade in one market (e.g., the "non-hedging" side), with the intention of quickly offsetting that position in another market (e.g., the "hedging" side). An automated trading tool is what most often performs at least the latter function—offsetting the position by quickly firing an order to the hedging side once the non-hedging order is matched. Hedging also includes taking an offsetting position in the same tradable object, such that the market represents both the hedging side and the non-hedging side.

A trader might use an automated trading tool in this way to trade a spread, which generally refers to the buying and/or selling of two or more tradable objects, the purpose of which is to capitalize on changes or movements in the relationships between the tradable objects. As used herein, the term "tradable object," refers simply to anything that can be traded with a quantity and/or price. It includes, but is not limited to, all types of tradable events, goods, and financial products. For instance, stocks, options, bonds, futures, currency, and warrants, as well as funds, derivatives and collections of the foregoing, and all types of commodities, such as grains, energy, and metals may be considered tradable objects. A tradable object may be "real," such as products that are listed by an exchange for trading, or "synthetic," such as a combination of real products that is created by the user. A tradable object could actually be a combination of other tradable object, such as a class of tradable objects.

Here is an example to illustrate. Some traders trade one tradable object—e.g., a trader might trade the September corn contract. That is, the trader is offering to buy or willing to sell the September corn contract, depending on his or her trading strategy. Likewise, a trader might trade the December corn contract. Some traders, however, trade more than one tradable object at a time. For example, a trader might want to spread trade the September corn contract and the December corn contract. Buying the "September/December" spread refers to buying the September corn contract and selling the December corn contract. Selling the "September/December" spread refers to selling the September corn contract and buying the December corn contract. Spreading can also be done based on other relationships besides calendar months. One such example would be trading a 10-year note and a 5-year note. According to these examples given above, the spread has two legs. Legs refer to the portions of the trades associated with each individual tradable object, which is also referred to as an outright market. For example, the "September/December" corn calendar spread has two legs, the September corn market makes up a leg and the December corn market makes up the other leg.

Spreads can have more than two legs. For example, a well-known spread strategy called the butterfly involves buying a near month contract, selling two middle month contracts, and buying a far month contract. An example might be buying "1" March corn contract, selling "2" June corn contracts, and buying "1" December corn contract. The butterfly spread strategy in this example has three legs. The March corn market makes up a first leg, the June corn market makes up a second leg, and the December corn market makes up a third leg. There are many other types of well-known spread strategies, besides the butterfly, which have more than two legs.

A commercially available trading tool that facilitates the automatic trading of spreads is Autospreader™ from Trading Technologies International, Inc. of Chicago, Ill. Once the legs of the spread are chosen and the relationship between them are defined, a user can input a desired spread price and quantity, and the Autospreader™ will automatically work orders in the legs to achieve the desired spread (or attempt to achieve the spread). The Autospreader™ is currently an add-on tool available with X_TRADER® Pro™, which is a trading application also available from Trading Technologies International, Inc.

U.S. patent application Ser. No. 10/137,979, entitled, "System and Method for Performing Automatic Spread Trading," filed on May 3, 2002, the contents of which are fully incorporated by reference herein, describes one such automated spread trading tool. An example is provided herein to illustrate how an automated spread trading tool like that described in the above incorporated application might work. While the example illustrates hedging in a related tradable object, the same concepts can be similarly applied to hedging in the same tradable object.

The market information given in FIG. 1 is used to illustrate the following example. In particular, FIG. 1 displays example order book information for two hypothetical tradable objects, referenced in the figure as product "1" and product "2." Each of the tradable objects may be offered by one electronic exchange or separate electronic exchanges; it does not matter for this example. The bid quantity is shown in the left columns, the corresponding price—or some symbolic representation thereof—is shown in the center columns, and the ask quantity is shown in the right columns for each tradable object. While presenting the order book information in this manner makes it easier to illustrate the following example, the actual format of the order book information does not matter for this example.

The inside market for each tradable object includes the best bid price (or the highest bid) and the best ask price (or the lowest ask). The best bid price represents the highest price any buyer is willing to pay for a given tradable object at a given time, and the best ask price represents the lowest price any seller is willing to sell a given tradable object at a given time. The quantity available at the inside market and at other price levels is referred to as market depth. Referring to FIG. 1, at a current moment in time, the inside market for product "1" is bid at "295" and ask at "297." The quantity available for product "1" at the inside market is "165" at the bid and "210" at the ask.

The inside market for product "2" is bid at "240" and ask at "242." The quantity available for product "2" at the inside market is "230" at the bid and "150" at the ask. Other bid and ask quantities at various price levels are also shown.

To begin, a trader will typically input certain parameters that the trader wishes to achieve by the spread trading tool, such as a desired spread price and a desired spread quantity. Then, the spread trading tool will use a predefined relationship of the spread to determine what actions to take next. As an example, let us assume that the desired spread price is "55" and the desired spread quantity is "750," although any price or quantity may be specified. In addition, let us assume that the trader wishes to sell the spread, which refers to selling "750" of product "1" and then, when that order is matched, the trader wishes to buy "750" of product "2." It is understood that the trader could choose a different spread price and/or spread quantity, and also the trader could set up the spread in a number of different ways (e.g., buying the spread, which refers to buying product "1" and selling product "2," etc.). Nonetheless, using the entered spread information, we will look at two different approaches generally taken by an automated spread trading tool.

The automated spread trading tool determines the price to sell "750" of product "1" by first determining the price would buy "750" of product "2." According to one approach (referred to as the "first approach" in FIG. 1), the trading tool will simply look to the lowest ask price of "242" because that represents the best price for which product "2" may be bought by the trader. (Alternatively, if the hedge order was to sell in product "2," the assumed price might be "242" because that represents the best price for which product "2" may be sold by the trader). Realizing that the best price to buy product "2" is "242," the non-hedging order to sell product "1" is priced at "297" in an effort to achieve the desired spread price of "55," (e.g., 55=297−242).

Unfortunately, there is not "750" available to buy at "242." Therefore, what would really happen is that the quantity at the next best prices (e.g., "243," "244," etc) would be bought up until the hedge order of "750" is filled. As a result, according to this example, the hedge order would actually average a price of "243," assuming that the market conditions did not change. The following relationship may be used to compute the average price at which "750" of product "2" could be bought:

$$\left(\frac{150}{750}\right)242 + \left(\frac{350}{750}\right)243 + \left(\frac{225}{750}\right)244 + \left(\frac{25}{750}\right)245 = 243$$

Because the average fill price for the hedge order was higher than previously anticipated, the achieved spread price would be "56," which is different from the desired spread price of "55." Oftentimes, this result is undesired because it can amount to a significant loss of money.

According to another approach (referred to as the "second approach" according to FIG. 1), the automated spread trading tool will account for the market depth in product "2." In doing so, the spread trading tool is computing a hedge order price based on a weighted average of prices. With this example, if the quantity needed was "750," then the weighted average price may be computed by taking quantity from various prices starting from the best price, which results in a price of "243." Realizing that the hedge order would actually be priced at "243," the non-hedging order to sell product "1" is priced at "298" in an effort to achieve the desired spread price of "55," (e.g., 55=298−243).

Unfortunately, in this instance, the nonhedging order is priced further off the market price in an effort to take into account the market depth. Because the non-hedging order is priced higher than market, it risks not being filled at all.

As automated trading tools become the norm in electronic trading, it is increasingly important to develop more intelligent tools to assist the trader in making the most desirable trades.

BRIEF DESCRIPTION OF THE DRAWINGS

Many aspects of the present embodiments may be better understood with reference to the following drawings. The components in the drawings are not necessarily to scale, emphasis instead being placed upon illustrating example embodiments.

FIG. 1 shows order book information for two hypothetical tradable objects to illustrate how a conventional automated spread trading tool might work to achieve a desired spread price and quantity;

FIG. 5 shows order book information for two hypothetical tradable objects to illustrate how the example computer-based system shown in FIG. 3 might work to achieve a desired spread price and quantity; and FIG. 6 shows generally the same order book information as in FIG. 5, except it represents the market some time later when the non-hedging orders have been matched and offset by the hedging side.

DETAILED DESCRIPTION

I. Introductory Overview

Figure 2:
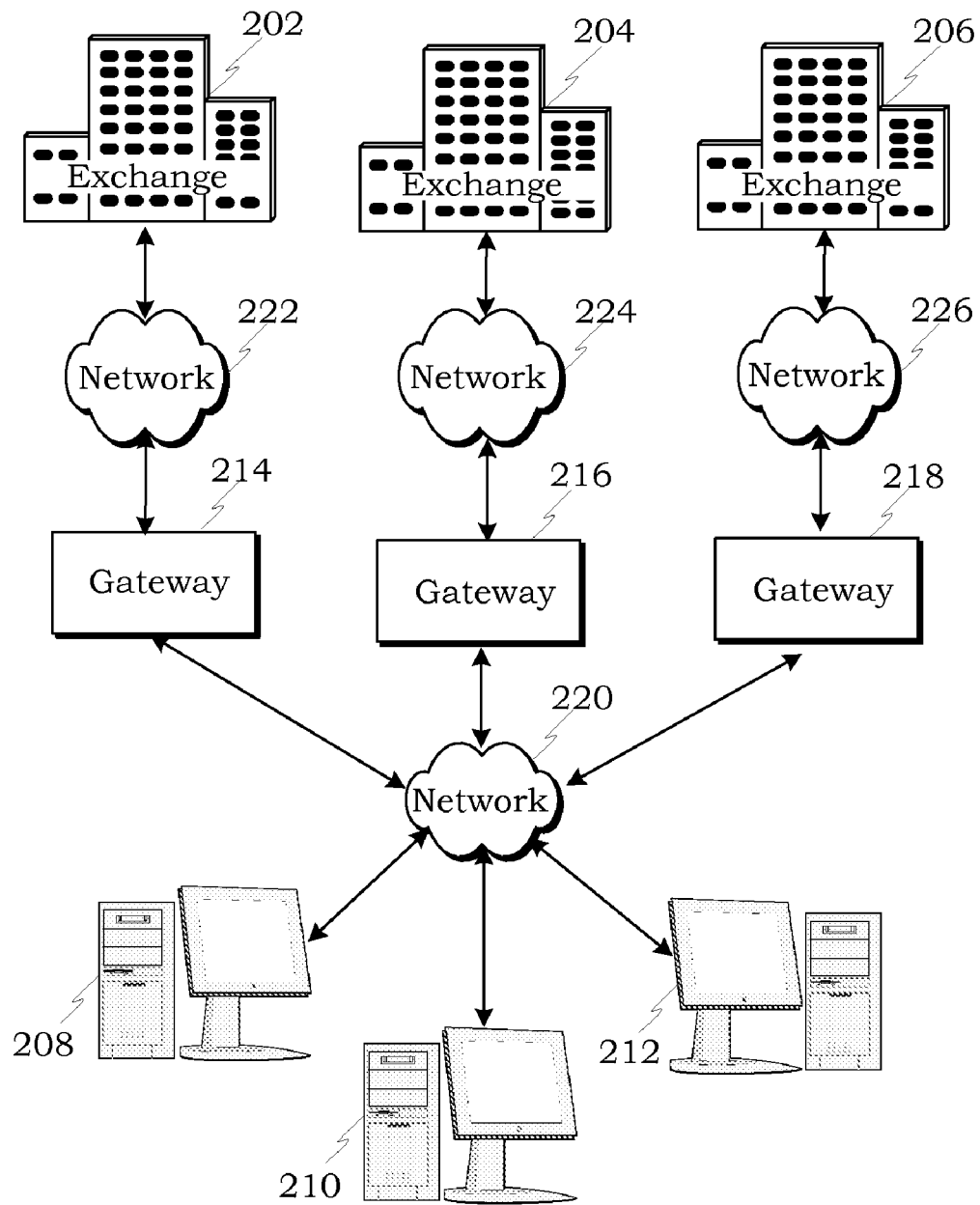
FIG. 2 illustrates an example electronic trading environment in which the example embodiments may be utilized.

The example system and method are appropriate for use in an electronic trading environment, and particularly when market depth is provided by the exchange in its data feed. The example system is configured to use the market depth information on the hedging side to make more intelligent decisions about the order entry on the non-hedging side. According to a particular embodiment, the order on the non-hedging side is broken up into multiple orders such that each order is automatically worked at cascading price levels. The quantity of each order is based on the desired quantity to be hedged and the market depth information on the hedging side. According to yet another particular embodiment, an order on the hedging side can also be intelligently broken up into multiple orders.

An advantage of using the example system is that there is an increased chance of achieving a desired spread price for at least those orders that have filled on the non-hedging side and the corresponding order(s) that have filled on the hedging side. By intelligently breaking up a quote into orders at cascading price levels based on market depth information on the hedging side, there is a better chance of receiving at least "partials" of the spread. That way, even if the entire original spread order was not achieved (e.g., because of changing market conditions), it maybe more likely that at least part of the spread will have been achieved for a price at or near the desired spread price.

A still further advantage is that the example system properly accounts for the quantity in the depth levels on the hedging side. Unlike other conventional automated trading tools, the example system can intelligently use this information in determining the price levels to place orders on the non-hedging side.

Another advantage is that the example system can also intelligently place orders on the hedging side. For instance, the example system allows for hedging at multiple price levels, or automate the hedging in smaller pieces over time. By applying a more intelligent approach to hedge orders (as opposed to the conventional process of "fire away and forget"), the example system offers an alternative beyond limit orders that can be legged or market orders.

Yet another advantage is that with manual-style trading there are physical limitations on the size and speed with which trades can be executed. Therefore, an advantage of using the example system is that trading efficiency can be greatly improved while offering increased reliability to achieve optimal results.

While the example embodiments are described in a particular area of electronic trading, namely spread trading, it will be understood by one of ordinary skill that the example embodiments may be embodied in many different forms to accommodate other styles of trading, and should not be construed as limited to the example embodiments set forth herein. Other features and advantages will become apparent to one with skill in the art upon examination of the following drawings and examples. It is intended that all such features and advantages be included within the scope of the present invention, and be protected by the accompanying claims. Further, it will be appreciated by those of skill in the art that the preferred system may be provided as methods or computer readable program means.

II. An Example System Overview

FIG. 2 is a representation of an example electronic trading environment in which the example system and method may be employed. It is understood that the electronic trading environment is presented for the purposes of illustration and description, and it is not intended to limit the present embodiment to the precise environment disclosed; many modifications and variations of the environment are possible.

The electronic trading environment, as shown, generally includes computers that operate as the trading stations 208, 210, 212, electronic exchanges 202, 204, 206 and intermediary devices such as gateways 214, 216, 218 to interface with the exchanges 202, 204, 206. Networks 220, 222, 224, 226 are shown to illustrate the paths of communication between the various elements. It is understood that other hardware and software packages can lie between the trading stations 208, 210, 212 and the electronic exchanges 202, 204, 206. These may include third-party machines and devices, third-party networks, hardware and/or software configurations specific to the customer site and security measures like firewalls, hubs, security managers, and routers. It is also understood that fewer hardware and software packages might be utilized between the trading stations 208, 210, 212 and the electronic exchanges 202, 204, 206. For instance, a gateway may not be necessary in some circumstances for a trading station to communicate with an electronic exchange, or alternatively, a single gateway could communicate with multiple exchanges.

Software running on any of the trading stations 208, 210, 212 and the gateways 214, 216, 218 allow traders to log onto the electronic exchanges 202, 204, 206 to receive price and market depth information. A trading station is a computer such as a personal computer, laptop computer, hand-held computer, and so forth that runs trading related software and communicates with electronic exchanges 202, 204, 206 either directly or indirectly. The trading software may create specialized interactive trading displays, which enable the traders to, among other things, obtain market quotes, monitor positions, and submit orders to the exchange.

Figure 3:
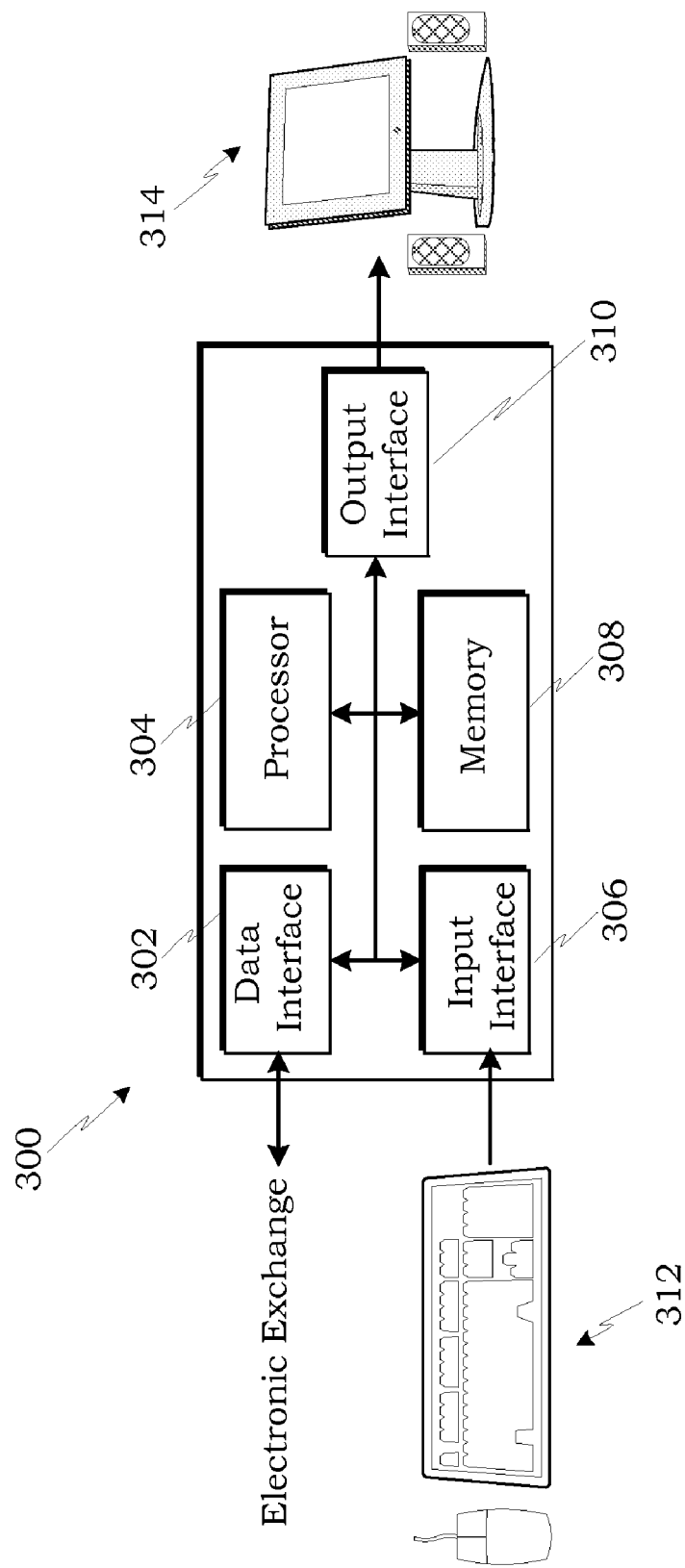
FIG. 3 illustrates an example computer-based system for use in an electronic trading environment such as shown in FIG. 2 for carrying out an example embodiment.

Any of the trading stations 208, 210, 212 may utilize the example system and method to improve order entry by intelligently using market depth information. FIG. 3 illustrates more detail of an example trading station, referenced to by general reference character 300, that is capable of carrying out the example embodiments. The trading station 300 includes a data interface 302 for receiving one or more various data feeds, a processor 304 for executing the software, an input interface 306 for communicating with input device(s) 312, a memory section 308 for representing temporary and/or permanent storage used by the trading station 300, an output interface 310 for controlling display unit and/or speakers 314. The system 300 is illustrative of a computer system that is capable of executing programmed logic to execute the example embodiments, especially in the environment shown in FIG. 2.

Turning back to FIG. 2, orders are automatically sent from the trading stations 208, 210, 212 to any of electronic exchanges 202, 204, 206, and all matches between buyers and sellers are executed by the receiving exchange. If an order doesn't get matched, the order is placed in the exchange's order book, which generally consists of queues of unexecuted orders hopefully waiting for the price to move in their direction.

Each electronic exchange offers a real-time data feed to the trading stations 208, 210, 212 that provides a certain level of detail on the trading activity. From such data, it is possible to reconstruct parts, if not most or all, of the exchange's order book. Such information may be looked upon as an expression of market sentiment and may provide strategic guidance for order placement. These data feeds may be monitored by the example system to automate the order generation process.

While the level of detail in the data feed often depends on the electronic exchange or the tradable object being traded, most data feeds provide the total quantity available at each of the best prices. The highest bid price and the lowest ask price are referred to as the inside market. Market depth refers to the quantity at the inside market and quantity available at the next best prices. For instance, if an electronic exchange provides five levels of market depth in its data feed to its customers, then the aggregate quantity levels for the five best bids and the five best offers are offered in the data feed. Some electronic exchanges provide limited levels of market depth while others provide all of the market depth.

III. An Example Method Overview

The following method is generally based on the premise that when using an automated spread trading tool, once an order in one leg is matched, the automated spread tool automatically offsets the filled order with a second order which is sent to the offsetting side (e.g., a second leg or opposite side of the market). This quick action in a conventional sense is sometimes referred to as "fire and forget." If the spread consists of more than two legs, then a different offsetting order might be sent to each of the offsetting legs. In the interest of clarity, the description of the example method assumes that the spread is made up of two legs, and that the price of the first order in the first leg (e.g., the non-hedging side) is based on the price at which the second order would get filled in the second leg (e.g., the hedging side), thereby achieving a certain spread price. The process can be easily adapted by one of skill in the art upon reading this description to implement spreads with more than two legs (or only one leg). In addition, there are many other ways to configure the spread than what is described in this example, which are known by one of ordinary skill in the art.

Figure 4:
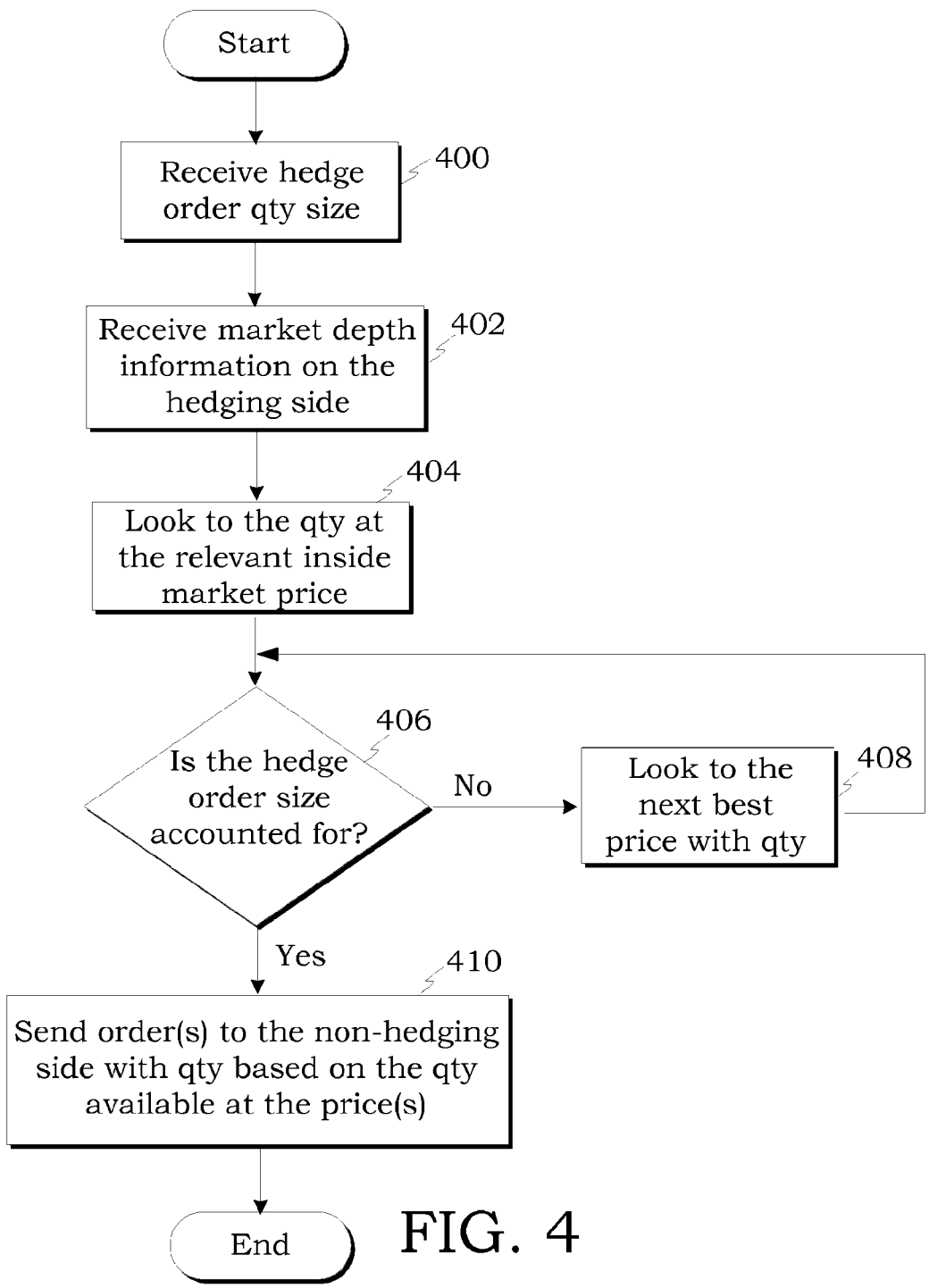
FIG. 4 is a flow chart that illustrates an example operation of the example computer-based system shown in FIG. 3.

FIG. 4 is a flow chart showing an example operation of breaking up a non-hedging order into multiple orders and determining the quantities of each of the orders; all or most of which may be carried out by the example trading system 300 shown in FIG. 3. Each block in FIG. 4 may represent a module, segment, or portion of code, which includes one or more executable instructions for implementing specific logical functions or steps in the process. Alternate implementations are included within the scope of the preferred embodiments in which functions may be executed out of order from that shown or discussed, including substantially concurrently or in reverse order, depending on the functionality involved, as would be understood by those reasonable skilled in the art. Further, it is understood that some steps may not need to be implemented to achieve the desired result.

At block 400, a possible hedge order quantity ("hedge order qty") is received. If an automated spread trading tool is used, then usually the possible hedge order quantity is derived from a formula based on the desired spread quantity. Most often, the desired spread quantity is entered by the user through a graphical user interface (GUI). According to U.S. patent application Ser. No. 10/137,979, the contents of which were fully incorporated above, one method for entering the desired spread price and spread quantity is by entering a "spread order," which represents the desired spread price and quantity, into the trading interface. As an example, if the desired spread quantity is "100," and the two legs have a one-to-one ratio ("1:1"), then the hedge order quantity would also be "100" and the non-hedge order quantity would be "100." In another example where the ratio is "2:5" and the desired spread quantity is "100," then the hedge order quantity would be "100," but the non-hedge order quantity would be "40." An example is provided below that illustrates having a ratio other than 1:1. Of course, other relationships and ratios may apply. It is also understood that the possible hedge order quantity may be manually entered by a user through a graphical interface—e.g., the user wants to hedge "X" amount, where "X" represents any number. Regardless of how the hedge order quantity is actually determined, the value is preferably stored in memory 308.

At block 402, market depth information for the hedging side is received by the example system. As indicated earlier, when the spread is initially set up, the "legs" of the spread (e.g., the tradable objects) are preferably chosen by the user. The selection of which may be used to determine which legs represent the hedging side and the non-hedging side. The example system may then use this information to retrieve the proper market depth information.

At block 404, the example system looks first to the quantity available at the relevant inside market price on the hedging side. Of course, the example system may be programmed to start at a price different than the market price, but most often the trader will want to look to the market price first. The spread definition may be used to determine whether the hedge order will be a buy or sell order, which then may be used to determine the relevant inside market price. For instance, if the hedge order will be an order to buy, then the relevant inside market price is the lowest ask price—and the example system will preferably look to the quantity available at the lowest ask price. If the hedge order will be an order to sell, then the relevant inside market price is the highest bid price—and the example system will preferably look to the quantity available at the highest bid price.

At block 406, the example system then determines if there is enough quantity at the relevant inside market price to fill a possible hedge order. In other words, is the hedge order size accounted for? As an example, if the hedge order quantity will be for "100," and the relevant inside market price has only "90" available, then there is not enough quantity to fill a possible hedge order quantity. However, if the inside market price has "100" or more, then presumably there would be enough quantity (at least for now). If there is currently not enough quantity to fill the hedge order, then follow the arrow to block 408. If there is currently enough quantity to fill a hedge order at the relevant inside market price, then follow the arrow to block 410. There might be times when the quantity level changes at the inside market or at any other price during these calculations; if so, then the example system can update these determinations accordingly.

At block 408, it is understood that there is not enough quantity at the relevant inside market price, so the example system looks further into the market depth—starting with the quantity at the next best price. It does this to find more quantity than what is currently available at the inside market to fill a possible hedge order. So, as an example, if the example system was looking at the highest bid price, then the logic will look to the quantity at the next highest bid price. If the example system was looking at the lowest ask price, then the logic will look to the quantity at the next lowest ask price.

Then, at block 406, the example system again determines whether there is currently enough total quantity at the inside market price and the next best price level(s) on the hedging side by summing the quantity at the inside market price and the next best price(s). As an example, if the hedge order quantity is for "100," and currently the inside market price has a quantity of "75," and the next best price has a quantity of "35," then together there would be enough quantity on the hedging to satisfy a possible hedge quantity of "100."

If there is not enough quantity, then return to block 408 and go the next best price—this process can continue indefinitely, if so programmed. If there is limited quantity available on the hedge side or the exchange provides few depth levels to determine this adequately, then preferably the user is alerted and the desired spread quantity can be reduced accordingly.

At block 410, the example system may respond by sending one or more orders to the non-hedging side, such that each order has a quantity based on the quantity found on the hedging side. If there was enough quantity at the relevant inside market price to fill a hedge order, then the example system does not have to break the order up into orders placed at cascading price levels. If the example system had to look further into the market depth, then two or more orders will preferably be sent to the non-hedging side. In particular, the example system breaks up the original quote into orders at cascading price levels, such that each order is for a quantity equal to a quantity available on the hedging side at a corresponding price. The total quantity of the orders should equal the desired hedge quantity. As an example, using the numbers from the example given above with respect to block 406, the example system would break up the order for "100" into a non-hedging order into one order for "75" at the inside market price and a second order for "25" at the next best price. Of course, the orders may be entered one at a time, if so desired (e.g., just sending the first order for "75"). A more detailed example is provided below to illustrate.

IV. Example

FIG. 5 displays example order book information, in a format similar to that as shown in FIG. 1, for two hypothetical tradable objects, referenced in the figure as product "1" and product "2." Using this information, an example is provided.

Assume that a user set up a trade that includes selling "750" of product "1" and, once the first order has filled, offsetting the position by buying "750" of product "2." It is also assumed, for sake of illustration, that the user's desired spread price is "55" and the ratio is "1:1." Therefore, according to block 400 in FIG. 4, the example system has received the hedge order quantity size of "750."

Per block 402, market depth information is received at the data interface 102 pertaining to the two tradable objects. For instance, referring to FIG. 3, the data interface 302 can received market depth information for the tradable objects.

Next, per block 404, the example system looks to the quantity available at the inside market price on the hedging side to determine whether there would be enough quantity to satisfy a hedge order of "750." In this example, the example system would look to the lowest ask price, because that is the best price we could buy at in the market. Currently, there is a quantity of "150" available.

Per block 406, the example system determines that "150" would not be enough quantity to fill a hedge order of "750." In other words, the amount of "750" is greater than "150."

Next, per block 408, the example system looks to the next best ask price, which is "243" and has a quantity of "350." So far, per block 406, the total quantity at the two best price levels is "150"+"350"="500," which is still not enough quantity to satisfy a hedge order of "750." The next best ask price is "244," and has a quantity of "225." Again, the total quantity of "150"+"350"+"225"="725" at the three best price levels is not enough. There is "25" available at "244." Per block 406, it would now be determined that there is enough quantity at the four best ask price levels (e.g., "150"+"350"+"225"+"25"="750").

Next, per block 410, the order to sell "750" of product "1" is preferably broken up into separate orders to coincide with the quantity available on the hedging side. A sell order (which can be seen in FIG. 5 under the column "Wrk Ord" in the window for product "1") for "150" is placed at "297," another sell order for "350" is placed at "298" another sell order for "225" is placed at "299" and a final sell order for "25" is placed at "300." In other words, the large non-hedging order for "750" is broken up into multiple orders, where each order rests at cascading price levels. Notice that the market depth (e.g., the ask quantity) for product "1" also includes the working order quantities.

FIG. 6 shows the same market information that was previously shown in FIG. 5, except some time later when the market moved up in value for product "1" and swept the order book. As a result, the orders on the non-hedging side were filled, and a hedge order for "750" was sent to buy whatever was available in product "2." According to one embodiment, the hedge order could be one order for "750" sent at a price of "245" or better (e.g., "242," "243," "244," and "245"), or alternatively, the hedge order could be broken up into multiple orders (e.g., an order to buy "150" at "242," an order to buy "350" at "243," an order to buy "225" at "244," and an order to buy "25" at "245"). If the hedge order was broken up into multiple orders, then when a non-hedging order is filled, the hedge order corresponding to that quantity may be sent. For instance, referring to FIG. 6, when the sell order for "150" at "297" is filled, then an offsetting order to buy "150" at "242," may be sent, regardless of what happens with the other non-hedging orders. That way, partial spreads may be achieved.

According to one advantage, the market depth on the hedging side is taken into account when placing one or more orders on the non-hedging side. Thus, if the orders are all filled (a sweep in the book for product "1"), then an offsetting order for a quantity of "750" may be immediately fired to offset the position in a more likely attempt to get the desired spread price of "55." For instance, assuming that the market conditions didn't change in product "2," then looking at each non-hedging order and its counterpart quantity on the hedging side accordingly:

If the spread partial for "150" is complete (e.g., the non-hedging side order of "150" was matched and the corresponding quantity of "150" on the hedging side was also matched): achieved spread price="55"=sold at "297"–bought at "242."

If the spread partial for "350" is complete (e.g., the non-hedging side order of "350" was matched and the corresponding quantity of "350" on the hedging side was also matched): achieved spread price="55"=sold at "298"–bought at "243."

If the spread partial for "225" is complete (e.g., the non-hedging side order of "225" was matched and the corresponding quantity of "225" on the hedging side was also matched): achieved spread price="55"=sold at "299"–bought at "244."

If the spread partial for "25" is complete (e.g., the non-hedging side order of "25" was matched and the corresponding quantity of "25" on the hedging side was also matched): achieved spread price="55"=sold at "300"–bought at "245."

According to another advantage, there is an increased chance of receiving partial fills on the large quantity of the spread order. Looking to the example of FIGS. 5 and 6, there is a better chance of the some of the orders getting filled because they rest at or near the inside market. Even if only some of the orders are filled, then it still has a chance of achieving the desired spread price. For instance:

If the first order for "150" was filled at "297," then an offsetting order for "150" would fill at a price of "242," which gives a spread price of "55." However, the market may now move down in value for product "1," thereby reducing the chances of getting more of the spread. Yet, the trader at least was partially filled on the spread.

As indicated earlier, the example system can break up the hedge orders as well. Using the examples above, the example system could send a hedge order for "750" at a price of "245" or better, or alternatively, the example system could send multiple hedge orders, as each non-hedge order is filled. So, for instance, when the non-hedge order for "150" at a price of "297" fills, then the example system could offset that quantity with a hedge order for "150" at a price of "242." Then, as the market moves through the non-hedging orders, the example system can appropriately send the offsetting orders.

Sometimes a trader might want to trade with a ratio different than "1:1," which was the ratio used in the previous illustration. To allow for different ratios, the example system preferably adjusts the order quantities (e.g., the orders which are going to be sent to the electronic exchange), accordingly.

For instance, let us still assume that a trader wants "750" of product "1," but the ratio is "10:6.6." Now, looking to product "2" in FIG. 5, there is a quantity of "150" at a price of "297." To achieve the ratio of "10:6.6," we would ordinarily need "227.2727 . . . " of product "1." However, usually an order quantity has to be a whole number (e.g., an order to buy "50" is acceptable, whereas an order to buy "50.4" would ordinarily not be acceptable). Therefore, according to one example embodiment, an order for a quantity of "227" is entered to sell product "1" at a price of "297." Then, a quantity left over of "0.2727 . . . " is carried over to the next order (or dropped, if so programmed). For instance, looking to product "2" again, and in particular, the next best price of "243," there is a quantity of "350." To achieve the ratio of 10:6.6, we would ordinarily need "530.3030 . . . " of product "1," however, we can add the leftover amount from the previous calculation to this amount, giving "530.3030+0.2727 . . . =530.5757 . . . ." According to one example, an order a quantity of "530" is entered to sell product "1" at a price of "298." Then, the quantity of "0.5757 . . . " is carried over, such that this process can be repeated until a quantity of "1" (or near "1") is reached, at which time the carry over is added to a particular order. Of course, there are other ways to accommodate a non-"1:1" ratio besides using a carry over; for example, by dropping the extra quantity, rounding up the quantity to the next whole number, rounding down the quantity to the next whole number, and so on.

As indicated earlier, when the quantities on the hedging side change, then the example system preferably updates the orders (e.g., order quantity and/or order price) on the non-hedging side. However, to reduce excess quoting it is possible to provide the user with a feature which refrains from re-pricing or re-quoting the order until a certain threshold is exceeded. To do this, a user may enter certain tolerance levels, or a condition, which represent in some manner how much change in quantity the user is willing to take before modifying an order or orders (e.g., frequency of quoting). Orders may be modified by simply canceling an order and submitting a new order based on the new data. Using this feature preferably causes the system to refrain from sending a new order and/or deleting the old order. The tolerance levels may be entered through a graphical user interface (GUI) that provides the user with the ability to program the feature. For instance, if the quantity of "150" on the offsetting side shown in FIG. 1 changes to "140," then maybe the trader does not want the system to re-price the order on the non-hedging side, and therefore, can program the system not to re-price the order. However, if the quantity changes to "125," then the trader can enable the system to change the corresponding order. Additional features that are centered around the prevention of excess quoting may also be included, such as the concept of "slop," which is described in U.S. patent application Ser. No. 10/137,979, the contents of which are fully incorporated by reference.

Recognizing the benefits of utilizing market depth information in order entry, the example system may be programmed to perform all sorts of functions:

For example, when only part of a non-hedging order is filled (e.g., referring to FIG. 5, assume that only "120" of the "150" was filled in product "1"), then the example system could be programmed to add quantity to that price level. This is assuming, however, that there is enough quantity available on the hedging side to make this particular feature effective—for instance, additional ask quantity might have been added by one or more traders (as the non-hedging order is filling or sometime thereafter) to the hedging side at a price of "242." Then, there would be more quantity to hedge on.

In another example, a trader might only want a certain number of orders in the market at any given time. In this instance, the trader might program the number of desired orders (e.g., on the hedging side and/or the non-hedging side) and the example system will break up the orders in multiple orders, but not exceeding the desired number of orders. For instance, a trader might only want three orders in the market on the non-hedging side. In this instance, the example system will break up the order into no more than three orders. If there simply is not enough quantity on a side to satisfy this requirement (e.g., the example in FIG. 5 required the order to be broken up into four orders), then the example system may alert the user and/or enter the orders for as much quantity as it currently can. Of course, other ways may be programmed.

In yet another example, a trader might want orders limited to certain quantity size. In this instance, the trader might want to limit orders to size no larger (or smaller, if desired) than a "50" lot order. Then, the system would have to adjust accordingly to accommodate this request, by either entering more orders in the market or by alerting the trader of a certain condition cannot be reached because of the limit—thus prompting a change.

In another example, the orders may be held back based on time or some other unit of measurement. According to this instance, a trader might want the broken up orders to be entered on certain time intervals.

In yet another example, it might be desirable to base the non-hedge order quantity (and/or the hedge quantity) on something other than quantity in the offsetting leg. In this instance, a trader might enter an equation in which the number of orders and/or the quantity of the orders is based.

V. Conclusion

Although the programs, processes, methods and system has been described and illustrated in detail, it is clearly understood that the same is by way of illustration and example only and is not to be taken by way of limitation. Since numerous modifications and changes will readily occur to those skilled in the art, it is not desired to limit the invention to the exact construction and operation shown and described, and accordingly, all suitable modifications and equivalents may be resorted to, falling within the scope of the invention.

According to one embodiment, the example system takes the form of a computer program product that is stored on a computer readable storage medium and is executed by a suitable instruction execution system in the computer-based device. The term computer readable medium, as used herein, refers to any medium that participates in providing instructions to processor for execution. Such a medium may take many forms, including but not limited to, non-volatile media, volatile media, and transmission media. Non-volatile media includes, for example, optical or magnetic disks, such as storage device. Volatile media includes dynamic memory, such as main memory or RAM (random access memory). Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, and any other memory chip or cartridge, or any other medium from which a computer can read.

According to an alternative embodiment, a hardware embodiment might take a variety of different forms. A hardware embodiment may be implemented as an integrated circuit with custom gate arrays or an application specific integrated circuit ("ASIC"). A hardware embodiment may also be implemented with discrete hardware components and circuitry. In particular, it is understood that the logic structures and method steps described in the flow diagrams may be implemented in dedicated hardware such as an ASIC, or as program instructions carried out by a microprocessor or other computing device.

The claims should not be read as limited to the described order of elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

What is claimed is:

1. A system including:
   a computing device,
      wherein the computing device is configured to receive a desired strategy quantity for a trading strategy at a desired strategy price, wherein the trading strategy is specified by a definition and includes a first leg for a first tradable object and a second leg for a second tradable object,
      wherein the computing device is configured to select a first hedge price, wherein the first hedge price is a price level for the second tradable object, wherein a first hedge quantity is available at the first hedge price,
      wherein the computing device is configured to generate a first order for the first tradable object, wherein the first order is at a first price for a first quantity, wherein the first price is determined based on the desired strategy price and the first hedge price, wherein the first quantity is determined based on the definition for the trading strategy, the desired strategy quantity, and the first hedge quantity,
      wherein the computing device is configured to select a second hedge price, wherein the second hedge price is a price level for the second tradable object, wherein a second hedge quantity is available at the second hedge price, wherein the second hedge price is different from the first hedge price,
      wherein the computing device is configured to generate a second order for the first tradable object, wherein the second order is at a second price for a second quantity, wherein the second price is determined based on the desired strategy price and the second hedge price, wherein the second quantity is determined based on the definition for the trading strategy, the desired strategy quantity, the second hedge quantity, and at least one of the first quantity and the first hedge quantity, and
      wherein the computing device is configured to initiate placement of the first order and the second order.

2. The system of claim 1, wherein the trading strategy is a spread.

3. The system of claim 1, wherein the first hedge price is one of a best bid price and a best ask price for the second tradable object.

4. The system of claim 1, wherein the second hedge price is a next best price level with respect to the first hedge price.

5. The system of claim 1, wherein the first quantity is determined further based on a predefined maximum quantity.

6. The system of claim 1, wherein the definition for the trading strategy includes a leg ratio, wherein the first quantity and the second quantity are determined further based on the leg ratio.

7. The system of claim 1, wherein the placement of the first order is initiated at substantially the same time as the placement of the second order.

8. The system of claim 1, wherein the placement of the second order is initiated at a predetermined time interval after the placement of the first order.

9. The system of claim 1, wherein the first tradable object and the second tradable object are listed at a same electronic exchange.

10. The system of claim 1, wherein the computing device is further configured to:
    initiate placement of a hedge order when the first order has been at least partially filled, wherein the hedge order is for the second tradable object at the first hedge price.

11. The system of claim 1, wherein the trading strategy includes a third leg for a third tradable object.

12. The system of claim 1, wherein the computing device includes at least one of a trading station, a gateway, and a server.

13. A system including:
    a computing device including:
       a receiver configured to receive a desired strategy quantity for a trading strategy at a desired strategy price, wherein the trading strategy is specified by a definition and includes a first leg for a first tradable object and a second leg for a second tradable object;
       a first hedge price selector configured to select a first hedge price, wherein the first hedge price is a price level for the second tradable object, wherein a first hedge quantity is available at the first hedge price;
       a first order generator configured to generate a first order for the first tradable object, wherein the first order is at a first price for a first quantity, wherein the first price is determined based on the desired strategy price and the first hedge price, wherein the first quantity is determined based on the definition for the trading strategy, the desired strategy quantity, and the first hedge quantity;
       a second hedge price selector configured to select a second hedge price, wherein the second hedge price is a price level for the second tradable object, wherein a second hedge quantity is available at the second hedge price, wherein the second hedge price is different from the first hedge price;
       a second order generator configured to generate a second order for the first tradable object, wherein the second order is at a second price for a second quantity, wherein the second price is determined based on the desired strategy price and the second hedge price, wherein the second quantity is determined based on the definition for the trading strategy, the desired strategy quantity, the second hedge quantity, and at least one of the first quantity and the first hedge quantity; and
       an order placer configured to initiate placement of the first order and the second order.

14. The system of claim 13, wherein the trading strategy is a spread.

15. The system of claim 13, wherein the first hedge price is one of a best bid price and a best ask price for the second tradable object.

16. The system of claim 13, wherein the second hedge price is a next best price level with respect to the first hedge price.

17. The system of claim 13, wherein the first quantity is determined further based on a predefined maximum quantity.

18. The system of claim 13, wherein the definition for the trading strategy includes a leg ratio, wherein the first quantity and the second quantity are determined further based on the leg ratio.

19. The system of claim 13, wherein the placement of the first order is initiated at substantially the same time as the placement of the second order.

20. The system of claim 13, wherein the placement of the second order is initiated at a predetermined time interval after the placement of the first order.

21. The system of claim 13, wherein the first tradable object and the second tradable object are listed at a same electronic exchange.

22. The system of claim 13, further including:
a hedge order placer configured to initiate placement of a hedge order when the first order has been at least partially filled, wherein the hedge order is for the second tradable object at the first hedge price.

23. The system of claim 13, wherein the trading strategy includes a third leg for a third tradable object.

24. The system of claim 13, wherein one of a trading station, a gateway, and a server includes the receiver, the first hedge price selector, the first order generator, the second hedge price selector, the second order generator, and the order placer.

* * * * *